Patented July 8, 1947

2,423,709

UNITED STATES PATENT OFFICE 2,423,709

4-ARYL THIAZOLE (AND SELENAZOLE)-5-ACETIC ACIDS AND ESTERS AND PROCESS OF PRODUCING THE SAME

Edward B. Knott, Wealdstone, England, assignor to Eastman Kodak Company, Rochester, N. Y., a corporation of New Jersey No Drawing. Application March 24, 1945, Serial No. 584,735. In Great Britain May 18, 1944

13 Claims. (Cl. 260—298)

This invention relates to 4-arylthiazole-5-acetic acids or esters and 4-arylselenazole-5-acetic acids or esters and to a process of preparing the same.

It is well known to produce thiazoles by the condensation of thioamides with α-halogenomonoketones or α-halogenomonoaldehydes.

We have found, and this forms the subject of the present invention, that 4-arylthiazole-5-acetic acids or esters and 4-arylselenazole-5-acetic acids or esters, or the substitution derivatives of any of these, are obtained when thioamides and selenamides (that is to say compounds containing the group

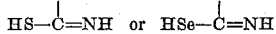

respectively) are condensed with β-halogen-β-cycloylpropionic acids or esters, or β-halogen-β-cycloyl-α-alkylpropionic acids or esters, or β-halogen-β-cycloyl-α-aralkylpropionic acid or esters, or β-halogen-β-cycloyl-α-arylpropionic acids or esters or the substitution derivatives of any of these. The term "cycloyl" is used to indicate the acyl residue of an aryl- or heterocyclic-carboxylic acid. These derivatives of propionic acids have the following general formula:

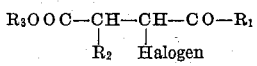

where R₁ is an aryl group or a heterocyclic group, and R₂ and R₃ are each either a hydrogen atom or an alkyl, aryl, or aralkyl group and may be the same or different.

The reaction appears to proceed according to the equation

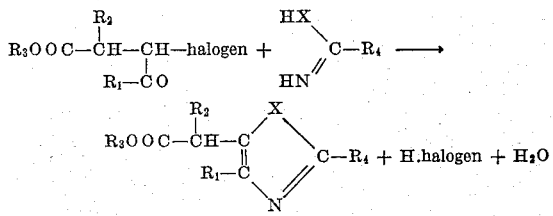

where R₁, R₂ and R₃ have the meanings given above, R₄ is a hydrogen atom or an alkyl, thiol, alkylthio, aralkylthio or amino group and X is sulfur or (in the case where R₄ is alkyl or amino) selenium. R₁ may be, for example, a phenyl, tolyl, naphthyl, ethylphenyl, isopropylphenyl, xylyl, anisyl, phenetyl or chlorophenyl group, or a heterocyclic group which may be a 5-membered or 6-membered group e. g. the residue of a thiophene nucleus.

Examples of thioamides which may be used are thioformamide, thioacetamide, thiourea, S-alkyl dithiocarbamates such as methyl dithiocarbamate and ethyl dithiocarbamate, and S-aralkyl dithiocarbamates such as benzyl dithiocarbamate, which give respectively simple 4-arylthiazole-5-acetic acids, 4-aryl-2-methylthiazole-5-acetic acids, 2-amino-4-arylthiazole-5-acetic acids, 2-methylthio-4-arylthiazole-2-acetic acids, 2-ethylthio-4-arylthiazole-5-acetic acids and 2-benzylthio-4-arylthiazole-5-acetic acids.

The reaction goes smoothly in all cases on bringing together in a suitable solvent equimolecular proportions of the halogen ketoacid and the thio- or seleno-compound. The reaction takes place rapidly at elevated temperatures and may be accelerated by the addition of alkalies, e. g. alkali carbonates or bicarbonates.

The condensation procedure with thioformamide is illustrated by the following example.

*Example 1.—4-phenylthiazole-5-acetic acid*

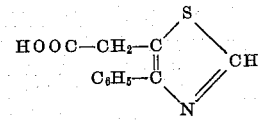

Thioformamide was prepared according to Gabriel (Ber. 1916, 49, 1145) by shaking for 20 hours 12 grams of phosphorus pentasulfide, 20 grams of formamide and 200 cc. of absolute ether. The pale yellow ethereal solution was decanted and used as such.

2.57 grams β-bromo-β-benzoylpropionic acid and 30 cc. of the above ethereal solution were shaken at room temperature (23° C.) to dissolve. The clear solution on standing became cloudy and after 4 hours, crystals of the required hydrobromide began forming. They were collected after 24 hours. The salt was dissolved in alcohol and diluted with water to precipitate the base. On crystallization from benzene, it formed fine colorless needles M. P. 154°–156° C.

The condensation procedure with thioacetamide was the same for all the bromaroylpropionic acids as far as the isolation of the crude condensate. This was as follows.

β-Brom-β-aroylpropionic acid (1 gram mole) was dissolved in isopropyl alcohol (500 cc.) by heating on the waterbath. Thioacetamide (1 gram mole) was then added and the heating continued until it had dissolved and the temperature of the solution was about 50° C. The flask was then removed from the waterbath and the temperature of the mixture which tended to rise owing to the heat of reaction, was kept at 60° C. by cooling for about 30 minutes. The solution turned yellow in all cases. After the reaction was complete as showed by a drop in temperature to about 40° C. which was after 1 to 2 hours, anhydrous sodium carbonate (½ gram mole) was added, shaking well to get a fine distribution. Carbon dioxide was evolved and precipitation of the required base commenced with varying degrees of rapidity. One of the slowest to form was from the unsubstituted brombenzoylpropionic acid which had stood for 48 hours. For the most part the reaction mixture solidified after 12 to 24 hours although in the case of the 4-alkoxy acid this was complete within 3 to 4 hours.

If the temperature of the reaction mixture was allowed to rise above 60° C. the formation of a crystalline hydrobromide often commenced and final yields were low; if this should be observed the yield can be raised by immediate addition of the carbonate to the hot solution. Low yields were obtained by refluxing the reactants for a short while on the water bath, giving chiefly an oil on working up, which was not crystallizable. Lower yields were also obtained by using a lower reaction temperature.

Having stood the reaction vessel for 1 to 2 days as the case may be, the whole was diluted to complete precipitation with water, and a small amount of dilute hydrochloric acid was added. After standing for ½ hour, the solid was collected and washed well with water. There was usually a small amount of oily by-product adhering to the granular precipitate which was effectively removed by transferring the solid to a wide necked flask and shaking well with ether. The ether was removed at the pump and the filtrate well washed with ether in which the acid is very sparingly soluble. The thiazoleacetic acids were then obtained as colorless grains.

By this procedure the following compounds were obtained.

4-phenyl-2-methylthiazole-5-acetic acid, thick colorless cubes or needles M. P. 200° to 202° C.

4-(4'-ethylphenyl)-2-methylthiazole-5-acetic acid, flat cream crystals M. P. 155° C.

4-(4'-iso-propylphenyl)-2-methylthiazole-5-acetic acid, flat cream needles M. P. 173° to 174° C.

4-(2',4'-dimethylphenyl)-2-methylthiazole-5-acetic acid, hard glassy cubes M. P. 199° to 200° C.

4-(4'-methoxyphenyl)-2-methylthiazole-5-acetic acid. Two forms were obtained on recrystallization from methanol; the first crop M. P. 189° to 190° C. had a weak white fluorescence under ultra-violet light and the second crop M. P. 177° to 179° C. exhibited a strong blue-green fluorescence under ultra-violet light but reverted to the modification M. P. 189° to 190° C. on recrystallziation or slow melting. 4-(4'-ethoxyphenyl)-2-methylthiazole-5-acetic acid; two forms were obtained on recrystallization from methanol; the first crop were glistening felted needles M. P. 188° to 190° C. which absorbed ultra-violet light and the second crop were large glass-clear pippins M. P. 169° to 190° C. fluorescing green under ultra-violet light which reverted to the modification M. P. 188° to 190° C. on recrystallization.

4-(4'-chlorophenyl)-2-methylthiazole-5-acetic acid, short needle clusters M. P. 200° to 204° C. with some previous softening.

This procedure was slightly modified when using bromthienoylpropionic acids, bromnaphthoylpropionic acids and bromaroylisobutyric acids, as illustrated by the following examples.

*Example 2.—4-(2'-thienyl)-2-methylthiazole-5-acetic acid*

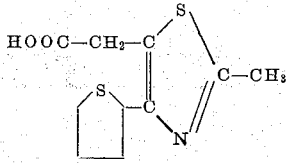

1.315 grams β-brom-β-thienoylpropionic acid and 0.375 gram thioacetamide were dissolved in 5 cc. cold isopropyl alcohol and allowed to stand 24 hours. A mass of crystals separated consisting of the hydrobromide of the required substance. They were collected, dissolved in spirit and the calculated quantity of Normal aqueous sodium hydroxide added to release the base. The alcoholic solution was diluted with water and the flocks collected and recrystallized from benzene. It formed colorless needles M. P. 158° to 159° C.

*Example 3.—4-(1'-naphthyl)-2-methylthiazole-5-acetic acid*

3.07 grams β-brom-β-(1-naphthoyl)propionic acid, 0.75 gram thioacetamide and isopropyl alcohol (20 cc.) were heated on the waterbath to 75° C. giving a clear yellow solution. The flask was then removed from the waterbath and the reaction mixture allowed to cool to 55° C. Anhydrous sodium carbonate (0.53 gram) was added and the mixture stood with occasional shaking for 48 hours. The required substance commenced to separate after several hours. The mixture was then diluted with water and a few drops of concentrated hydrochloric acid precipitating an oil which partially solidified on standing. The solids were collected, washed with water, transferred to a flask and brought to a boil with sufficient methyl alcohol to dissolve the oil. After cooling, the solid was collected and well washed with cold methyl alcohol. The substance was difficult to crystallize and was purified by dissolving in aqueous carbonate, precipitating with dilute acid, washing the soft cake with water and dissolving immediately in cold methyl alcohol. Almost immediately the monohydrate crystallized out as colorless needles. This process was repeated yielding 1.7 grams M. P. 212° to 213° C. It fluoresced blue in ultra-violet light.

*Example 4.—4-(2'-naphthyl)-2-methylthiazole-5-acetic acid*

92.1 grams β-brom-β-(2-naphthoyl)propionic acid, 22.5 grams thioacetamide and isopropyl alcohol (300 cc.) were heated to 75° C. to dissolve. The liquor was then allowed to cool to 55° C. and anhydrous sodium carbonate (15.9 grams) added with shaking. Carbondioxide was evolved and the required substance commenced to separate.

The flask was left standing for 48 hours at room temperature (23° C.) and diluted with water and a little dilute hydrochloric acid. The colorless grains were well washed with water and recrystallized from spirit forming small colorless crystals M. P. 226° to 229° C. fluorescing blue in ultra-violet light.

*Example 5.—α-5-(4-phenyl-2-methylthiazole)-propionic acid*

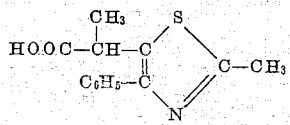

2.71 grams β-bromo-β-benzoylisobutyric acid and 0.75 gram thioacetamide in 40 cc. ethanol were heated to 50° C. to dissolve and 0.53 gram sodium carbonate added. The mixture was allowed to stand for two days and then decomposed with water. The thick oil thrown down partially solidified on standing. It was collected, washed free from oil with ether and recrystallized from methanol in hard, glistening needle rosettes M. P. 172° to 173° C.

The procedure using an ester and thioacetamide is illustrated by the following example.

*Example 6.—4-phenyl-2-methylthiazole-5-acetic acid methyl ester*

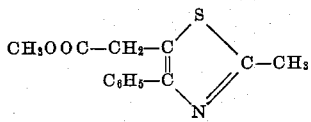

5.42 grams methyl $\beta$-bromo-$\beta$-benzoylpropionate and 1.5 grams thioacetamide were dissolved by gentle warming in 5 cc. ethyl alcohol. 2.12 grams anhydrous sodium carbonate were then added and the mixture refluxed for 5 minutes. On allowing to cool, the whole solidified. It was broken up with the addition of water and the white solid collected. Recrystallized from methanol, it formed glassy prisms M. P. 132° to 133° C.

1.24 grams of the above ester were dissolved in 20 cc. spirit and 0.56 gram potassium hydroxide in 2 cc. water added at 80° C. The flask was allowed to cool, left standing for 3 hours at 20° C., poured into water and the acid precipitated with acetic acid. Recrystallized from alcohol, it formed colorless needles or prisms M. P. 203° to 204° C.

The condensation procedure with thiourea was as follows:

The $\beta$-bromo-$\beta$-aroyl-propionic acid (1 gram mole) and thiourea (1 gram mole) were heated to dissolve in isopropyl alcohol (500 cc.) and the heating continued until a deep yellow color had developed. Anhydrous sodium carbonate (0.5 gram mole) was then added and the heating continued for 5 minutes. The yellow meal thus formed was diluted with water to dissolve inorganic salts and the solid collected and well washed with water, then with spirit. The latter removed a yellow coloring matter leaving a cream solid.

By this procedure the following compounds were obtained.

2-amino-4-phenylthiazole-5-acetic acid, colorless needle rosettes M. P. 230° to 231° C.

The hydrochloride obtained, if the sodium carbonate addition is omitted, forms flat colorless needles M. P. 249° C.

2-amino-4-(4'-methylphenyl)thiazole-5-acetic acid, colorless, hairlike needles M. P. 224° C. (dec.).

This procedure was slightly modified when using bromthienoylpropionic acids, bromnaphthoylpropionic acids and bromaroylisobutyric acids, as illustrated by the following examples.

*Example 7.—2-amino-4-(2'-thienyl)thiazole-5-acetic acid*

0.263 gram $\beta$-brom-$\beta$-thienoylpropionic acid and 0.076 gram thiourea were dissolved in 5 cc. of isopropyl alcohol and heated on the waterbath to dissolve. 0.053 gram sodium carbonate was added causing the mixture to solidify. The yellow grains were collected, washed and recrystallized from ethanol forming tiny yellow crystals M. P. 202° to 203° C.

*Example 8.—2-amino-4-(1'-naphthyl)thiazole-5-acetic acid*

3.07 grams $\beta$-bromo-$\beta$-(1-naphthoyl)propionic acid, 0.76 gram thiourea and isopropyl alcohol (20 cc.) were boiled for 2 minutes giving a clear yellow solution. Anhydrous sodium carbonate (0.53 gram) was added with agitation and the heating continued for 10 minutes. Under evolution of carbon dioxide a thick meal of the required substance separated. The whole was diluted with water (100 cc.), the solid collected, washed several times with water, then with spirit and dried.

*Example 9.—2-amino-4-(2'-naphthyl)thiazole-5-acetic acid*

The condensation conditions were exactly the same as for the $\beta$-1-isomer. The purification was complicated by the fact that although the substance was soluble in a large volume of alcohol, no crystallization occurred on cooling and on concentrating decomposition occurred. It can be purified by dissolving in sodium carbonate and reprecipitating with dilute acetic acid, this treatment giving a monohydrate. It formed colorless grains M. P. 255° to 256° C.

*Example 10.—$\alpha$-5-(2-amino-4-phenylthiazole)-propionic acid*

1.35 gram $\beta$-bromo-$\beta$-benzoylisobutyric acid and 0.38 gram thiourea in 10 cc. ethyl alcohol were boiled to dissolve and 0.265 gram anhydrous sodium carbonate were added and the boiling continued for 10 minutes. The solution turned faintly yellow and carbon dioxide was released. On allowing to cool, a solid separated. The mixture was diluted with water, the solid collected, washed with water then spirit and recrystallized from isopropyl alcohol. It formed a white powder M. P. 230° C.

The procedure using an ester and thiourea is illustrated by the following example.

*Example 11.—2-amino-4-phenylthiazole-5-acetic acid methyl ester*

5.42 grams methyl $\beta$-brom-$\beta$-benzoylpropionate, 1.52 grams thiourea and 10 cc. isopropyl alcohol were boiled to dissolve and 1.06 gram anhydrous sodium carbonate added and boiled a further 5 minutes. On dilution with water, a yellow oil was precipitated which rapidly crystallized. Recrystallized from ethyl alcohol, it formed pale yellow prisms M. P. 167°–168° C.

Hydrolysis of the ester was carried out as in Example 6. Recrystallized from alcohol, the resulting acid melted at 233° C.

The condensation procedure with S-alkyl dithiocarbamates was as follows:

The $\beta$-bromo-$\beta$-aroylpropionic acid (1 gram mole) and the S-alkyl dithiocarbamate (1 gram mole) were shaken at room temperature (23° C.) with isopropyl alcohol (50 cc.) until solution was complete then left standing for 48 hours. On dilution with water (2 liters) a thick oil separated which solidified on standing 24 hours. The aqueous alcoholic layer also deposited a crystalline solid. The solid was collected, dissolved in a minimum of benzene and dried over anhydrous sodium sulfate. Petrol ether (40° to 80° B. P.) was added until a faint opalescence was given. The substance then crystallized. Alternatively it was recrystallized from dilute spirit.

By this procedure the following compounds were obtained:

2-methylthio-4-phenylthiazole-5-acetic acid, tiny needle rosettes M. P. 145° C.

2-ethylthio-4-phenylthiazole-5-acetic acid which after one recrystallization formed long silky needles M. P. 83° C.; after a further recrystallization they formed fine colorless needles M. P. 116° C. containing 1 molecule of water of crystallization. 2-methylthio-4-(4-methylphenyl)thiazole-5-acetic acid, colorless needle clusters M. P. 176° C.

*Example 12.—2-amino-4-phenylselenazole-5-acetic acid*

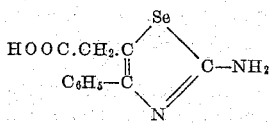

2.46 grams selenourea, 5.14 grams β-brom-β-benzoylpropionic acid and 20 cc. isopropyl alcohol were boiled for 10 minutes on the waterbath and 3 grams solid sodium carbonate added. Effervescence occurred and after a further 5 minutes heating the solution set to a solid mass of crystals. They were dissolved by adding water, the solution filtered and the required substance precipitated by dilute acetic acid. The bulky pink precipitate was recrystallized from a water-spirit mixture and obtained as pale yellow needles melting at 253° C. with decomposition, commencing at 196° C.

The procedure with dithiocarbamates is illustrated by the following example.

*Example 13.—2-ethylthio-4-phenylthiazole-5-acetic acid*

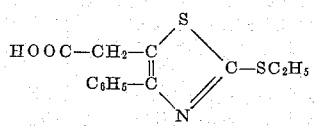

2.57 grams β-bromo-β-benzoylpropionic acid, 1.21 gram ethyldithiocarbamate and 10 cc. isopropyl alcohol were shaken to dissolve and left standing for 48 hours. On dilution with water, an oil was precipitated which crystallized through. It was recrystallized from benzene-petroleum ether and formed tiny white needles melting at 116° C. and contains 1 mol. water of crystallization.

*Example 14.—2-methylthio-4-(1'-naphthyl)thiazole-5-acetic acid*

3.07 grams β-brom-β-(1-naphthoyl)propionic acid, 1.09 gram methyldithiocarbamate and isopropyl alcohol (30 cc.) were heated to 60° C. to dissolve. Anhydrous sodium carbonate (0.53 gram) was added and the mixture stood for 48 hours (if the carbonate be omitted the bromoacid crystallizes on cooling). Water (200 cc.) was added precipitating an oil which after 4 hours had solidified and a mass of glittering crystals had formed in the aqueous-alcoholic layer. The solids were collected, washed with water and dried. They were dissolved in benzene and petroleum ether added when cold. A certain amount of yellow oil was precipitated. The liquor was decanted and a further addition of petroleum ether made. On standing, hard crystalline balls commenced forming. Recrystallized from benzene, they formed colorless crystalline balls of needles, M. P. 125° C. fluorescing blue in ultra-violet light.

*Example 15.—2-methylthio-4-(2'-naphthyl)thiazole-5-acetic acid*

3.07 grams β-brom-β-(2-naphthoyl)propionic acid and 1.09 grams methyldithiocarbamate were shaken at room temperature (21° C.) with isopropyl alcohol (15 cc.) until dissolved. The yellowish solution was left standing for 48 hours. A mass of colorless crystals of the required hydrobromide had then separated. The whole was diluted with water yielding a yellow oil which soon solidified. The solids were collected, dissolved in aqueous sodium carbonate and reprecipitated with dilute acetic acid. The solid was collected, washed with water and then with methylene chloride to remove traces of oil. Recrystallized from benzene, they formed glittering opaque prisms of needles M. P. 154° C. fluorescing blue in ultra-violet light.

*β-Bromo-β-aroyl propionic acids*

The β-bromo derivatives were all prepared by reacting the required acid with equimolecular proportions of bromine using chloroform as solvent. The two bromoacids described in the literature are β-brom-β-benzoyl-propionic acid (Bougault, Ann. Chim. (8) 15, 464) and β-bromo-β-(4-methoxybenzoyl)propionic acid (Bougault, loc. cit., p. 514). Their melting points are confirmed.

The general procedure was to dissolve or suspend the acid (say 250 grams) in 8 times the volume of boiling chloroform (2 liters) and add a little of the bromine (2 cc.) and continue heating until decolorized. The flask was then removed from the water bath and in the majority of cases further additions of bromine reacted rapidly on shaking. Only in the case of the 4-chlorobenzoylpropionic acid was it found necessary to add all the bromine and to boil the mixture for 15 to 20 minutes before reaction took place. The process of working up the reaction mixture was the same in all cases. The chloroform was washed 6 times with water in a separating funnel, dried over calcium chloride and the chloroform removed, finally under reduced pressure. The resultant oil was then rapidly poured into a small amount of carbondisulfide. Crystallization was rapid in some cases (benzoyl, 4-methylbenzoyl, 4-alkoxybenzoyl, 4-chlorobenzoyl) but in others it was necessary to remove a small amount of the oil and induce crystallization by scratching followed by inoculation of the bulk (4-isopropylbenzoyl, 2:4- and 3:4-dimethylbenzoyl). The bromo-ethylbenzoylpropionic acid could not be obtained crystalline.

The acids were washed with carbon disulfide and recrystallized from the same solvent (except the isopropylhomologue). The characteristics are given below.

β-Brom-β-(4-methylbenzoyl)propionic acid, colorless flat needles M. P. 122° to 124° C.

β-Brom-β-(4-ethylbenzoyl)propionic acid, pale yellow oil.

β-Brom-β-(4-isopropylbenzoyl)propionic acid, irregular shaped knobs M. P. 73° to 75° C.

β-Brom-β-(2:4-dimethylbenzoyl)propionic acid, glassy needles M. P. 98.5° C.

β-Brom-β-(3:4-dimethylbenzoyl)propionic acid, thick glassy needles M. P. 99° C.

β - Brom - β - (4-ethoxybenzoyl)propionic acid, needles M. P. 130° C.

β - Brom - β - (4 - chlorobenzoyl)propionic acid, glassy needles M. P. 115° to 116° C.

β-1- and β-2-naphthoylpropionic acids

Proceeding according to the instructions of Haworth (J. Chem. Soc. London 1932, 1129) naphthalene 400 grams) and succinic anhydride (200 grams) intimately mixed were added over a few minutes to a cold solution of aluminum chloride (550 grams) in nitrobenzene (2,000 cc.) (Haworth used here what was equivalent to 1500 cc. nitrobenzene but this amount was increased to aid in the separation of the two acids). After 12 hours the reaction mixture was decomposed with dilute hydrochloric acid yielding a large amount of solid. This was filtered from the aqueous-nitrobenzene layers and washed with water and ether. It consisted almost entirely of the β-2-isomer. To purify, it was dissolved in hot aqueous 2N-sodium carbonate, filtered and acidified. Recrystallized from methyl alcohol, it yielded 145 grams of β-2-naphthoylpropionic acid fluorescing blue in ultra-violet light.

The aqueous-nitrobenzene layers were shaken with ether (1 liter) and the aqueous layer discarded. The nitrobenzene layer was extracted several times with small amounts of 2N-sodium carbonate until the extracts gave no precipitate on acidification. The alkaline extract was filtered and acidified. The solid so obtained consisted solely of the β-1-acid. Recrystallized from methyl alcohol, a yield of 148 grams of β-1-naphthoylpropionic acid was obtained. It also fluoresced blue in ultra-violet.

β-Bromo-β-(1-naphthoyl)propionic acid

β-(1-naphthoyl)propionic acid (109 grams) suspended in chloroform (800 cc.) was brought to a boil on the waterbath and bromine (2 cc.) added. The heating was continued until the color had vanished. The remainder of the bromine (22.5 cc.) was then added in small portions, the reaction taking place rapidly without further application of heat. The flask was shaken well after each addition.

The chloroform solution was then washed three times by shaking well with water in a separating funnel. The third washing caused almost complete precipitation of the required bromo-acid. The crystalline solid was collected, the chloroform layer dried and the chloroform removed. Total yield of solid was 121 grams. Recrystallized from benzene, the acid formed short silky cream needles M. P. 172° to 173° C. (turning red). The acid did not fluoresce in ultra-violet light.

β-Bromo-β-(2-naphthoyl)propionic acid

β-(2-naphthoyl)propionic acid (114 grams) suspended in chloroform (1250 cc.) was brominated as for the β-1-isomer using 25.6 cc. bromine. No crystallization occurred during washing. After drying the solution over sodium sulfate, the chloroform was removed, finally under reduced pressure, and the oil poured into carbondisulfide (200 cc.), the flask being rinsed out with two further amounts of 20 cc. carbondisulfide. Crystallization took place readily yielding 136 grams of the required substance.

Recrystallized from benzene, it formed tiny colorless needles M. P. 133° to 135° C. (turning red). It did not fluoresce in ultra-violet light.

β-2-thienoylpropionic acid and β-brom-β-(2-thienoyl)propionic acid were prepared as follows:

β-2-thienoylpropionic acid

To a mixture of nitrobenzene (100 cc.), succinic anhydride (11 grams) and aluminum chloride (29.3 grams) at 10° C. a solution of thiophene (8.4 grams) in nitrobenzene (10 cc.) was slowly added over 15 minutes with efficient stirring. The temperature was not allowed to rise above 12° C. and was cooled to 10° C. before each addition. The mixture was kept at 10° C. for one hour and at room temperature for 3 hours. It was then decomposed with dilute hydrochloric acid and the nitrobenzene driven off with steam. The solid formed after decomposition with the acid disappeared during the steam distillation leaving a little oil which was removed by filtration of the hot liquor, the filtrate depositing 7.7 grams of the acid as lustrous, colorless plates. Recrystallized from water they melted at 116.5° to 119.5° C.

β-Brom-β-2-thienoylpropionic acid

β-2-thienoylpropionic acid (1.3 grams) in chloroform (20 cc.) was treated with one molecular equivalent of bromine (0.35 cc.) and the mixture boiled until the color of the bromine disappeared which required 2 to 3 minutes. The pale yellow solution was washed thrice with water, the chloroform solution dried over anhydrous sodium sulfate and the chloroform removed, finally under reduced pressure. Carbondisulfide (10 cc.) was added to the thick oil, boiled to dissolve and allowed to cool. The required acid separated as pale brown cubes. Recrystallized from carbon disulfide it formed almost colorless prisms M. P. 127° to 128° C.

β-Brom-β-benzoylisobutyric acid is readily prepared from β-benzoylisobutyric acid (Oppenheim Ber. 1901, 34, 4328) by direct bromination in chloroform. This latter acid is prepared from methylsuccinic acid anhydride by a Friedel-Crafts Reaction with benzene. Analogous β-aroylisobutyric acid can be similarly prepared and brominated. Similarly, other alkyl, aryl or aralkyl substituted succinic anhydrides can be used to give other substituted β-cycloylpropionic acids.

Methyl β-brom-β-benzoylpropionate was prepared as follows:

95 grams β-benzoylpropionic acid and 200 cc. of a 10% sulfuric acid-methyl alcohol mixture were refluxed for 4 hours. The reaction product into water, taken up in ether, extracted several times with aqueous sodium carbonate, washed with water, dried over anhydrous sodium sulfate and the ether removed. The residual oil was fractionated. B. P. 180° C./17 mm.

76.8 grams ester in 100 cc. chloroform were warmed and 2 cc. bromine added. As soon as the color had disappeared, the remainder of the bromine (18.5 cc.) was added slowly with shaking at 20° C. The liquor was repeatedly washed with water, dried and the chloroform removed. The bromo ester then formed a thick oil.

The 4-arylthiazole-5-acetic acids and 4-arylselenazole-5-acetic acids which can be made by the present invention, may be used for the production of naphthathiazoles, naphthaselenazoles, thionaphthenothiazoles, thionaphthenoselenazoles, phenanthrathiazoles and phenanthraselenazoles as described in my copending application Serial No. 584,736, filed of even date herewith.

The thiazole and selenazole compounds obtained according to my invention can be named in an alternative manner, as illustrated below:

| Name employed above | Alternative name |
|---|---|
| 4-phenylthiazole-5-acetic acid | 5-carboxymethyl-4-phenylthiazole. |
| 4-(4'-ethylphenyl)-2-methylthiazole-5-acetic acid | 5-carboxymethyl-4-(4'-ethylphenyl)-2-methylthiazole. |
| 4-phenyl-2-methylthiazole-5-acetic acid methyl ester | 5-carbmethoxymethyl-4-phenyl-2-methylthiazole. |

Similarly the other names employed above can be expressed in an alternative manner.

It is to be understood that the thioamide group can be formulated in two manners as follows:

$$\underset{(1)}{-\overset{S}{\overset{\|}{C}}-NH_2} \quad or \quad \underset{(2)}{-\overset{SH}{\overset{|}{C}}=NH}$$

The (2) form is employed herein. Actually in reactions, the thioamides probably exist in two forms corresponding to the groups formulated above, the two forms being in equilibrium with one another. The same is true of the selenamide group which can be formulated in two manners as follows:

$$\underset{(3)}{-\overset{Se}{\overset{\|}{C}}-NH_2} \quad or \quad \underset{(4)}{-\overset{SeH}{\overset{|}{C}}=NH}$$

The (4) form is employed herein.

What I claim as my invention and desire to be secured by Letters Patent of the United States is:

1. The azole compounds of the following general formula:

$$R_3OOC-\overset{R_2}{\underset{R_1-C}{\overset{|}{C}H}}-\overset{X}{\underset{N}{C}}\diagdown C-R_4$$

wherein $R_1$ represents a member selected from the group consisting of aryl and 2-thienyl groups, $R_2$ and $R_3$ each represents a member selected from the group consisting of hydrogen, an alkyl group, an aralkyl group and an aryl group, $R_4$ represents a member selected from the group consisting of hydrogen, an alkyl group, a thiol group, an alkylthio group, an aralkylthio group, and an amino group, and X represents sulfur when $R_4$ has the values recited above and X represents selenium when $R_4$ represents a member selected from the group consisting of an alkyl group and an amino group.

2. The thiazole compounds having the following general formula:

$$R_2OOC-\overset{R_2}{\underset{R_1-C}{\overset{|}{C}H}}-\overset{S}{\underset{N}{C}}\diagdown C-R_4$$

wherein $R_1$ represents a member selected from the group consisting of aryl and 2-thienyl groups, $R_2$ and $R_3$ each represents a member selected from the group consisting of hydrogen, an alkyl group, an aralkyl group and an aryl group, and $R_4$ represents a member selected from the group consisting of hydrogen, an alkyl group, a thiol group, an alkylthio group, an aralkylthio group and an amino group.

3. The thiazole compound having the following formula:

$$HOOC-CH_2-\overset{S}{\underset{C_6H_5-C}{\overset{\|}{C}}}\diagdown\overset{}{\underset{N}{C}}-CH_3$$

4. The thiazole compounds having the following formula:

$$HOOC-CH_2-\overset{S}{\underset{C_6H_5-C}{\overset{\|}{C}}}\diagdown\overset{}{\underset{N}{C}}-SR$$

wherein R represents an alkyl group.

5. The thiazole compound having the following formula:

$$HOOC-CH_2-\overset{S}{\underset{C_6H_5-C}{\overset{\|}{C}}}\diagdown\overset{}{\underset{N}{C}}-SCH_3$$

6. The thiazole compound having the following formula:

$$HOOC-CH_2-\overset{S}{\underset{C_6H_5-C}{\overset{\|}{C}}}\diagdown\overset{}{\underset{N}{C}}-NH_2$$

7. A process for preparing an azole comprising condensing a compound selected from those which are represented by the following general formula:

$$\overset{HX}{\underset{HN}{\diagdown}}C-R_4$$

wherein $R_4$ represents a member selected from the group consisting of hydrogen, an alkyl group, a thiol group, an alkylthio group, an aralkylthio group and an amino group, and X represents sulfur when $R_4$ represents the values recited above, and X represents selenium when $R_4$ represents a member selected from the group consisting of an alkyl group and an amino group, with a carboxylic compound selected from those represented by the following general formula:

$$R_1-CO-\overset{R_2}{\underset{Halogen}{\overset{|}{C}H}}-CH-COOR_3$$

wherein $R_1$ represents a member selected from the group consisting of an aryl group and a 2-thienyl group, and $R_2$ and $R_3$ each represents a member selected from the group consisting of hydrogen, an alkyl group, an aralkyl group and an aryl group.

8. A process for preparing an azole comprising condensing a compound selected from those which are represented by the following general formula:

$$\overset{HX}{\underset{HN}{\diagdown}}C-R_4$$

wherein $R_4$ represents a member selected from the group consisting of hydrogen, an alkyl group, a thiol group, an alkylthio group, an aralkylthio group and an amino group, and X represents sulfur when $R_4$ represents the values recited above, and X represents selenium when $R_4$ represents a member selected from the group consisting of an alkyl group and an amino group, with a carboxylic compound selected from those represented by the following general formula:

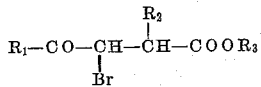

wherein $R_1$ represents a member selected from the group consisting of an aryl group and a 2-thienyl group, and $R_2$ and $R_3$ each represents a member selected from the group consisting of hydrogen, an alkyl group, an aralkyl group and an aryl group.

9. A process for preparing a thiazole comprising condensing a compound selected from those which are represented by the following general formula:

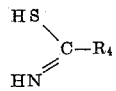

where $R_4$ represents a member selected from the group consisting of hydrogen, an alkyl group, a thiol group, an alkylthio group, an aralkylthio group and an amino group, with a carboxylic compound selected from those represented by the following general formula:

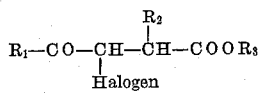

wherein $R_1$ represents a member selected from the group consisting of an aryl group and a 2-thienyl group, and $R_2$ and $R_3$ each represents a member selected from the group consisting of hydrogen, an alkyl group, an aralkyl group and an aryl group.

10. A process for preparing a thiazole compound comprising condensing a compound selected from those which are represented by the following general formula:

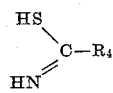

wherein $R_4$ represents a member selected from the group consisting of hydrogen, an alkyl group, a thiol group, an alkylthio group, and an amino group, with a carboxylic compound selected from those represented by the following general formula:

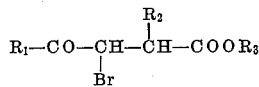

wherein $R_1$ represents a member selected from the group consisting of an aryl group and a 2-thienyl group, and $R_2$ and $R_3$ each represents a member selected from the group consisting of hydrogen, an alkyl group, an aralkyl group and an aryl group.

11. A process for preparing a thiazole compound comprising condensing a compound selected from those represented by the following general formula:

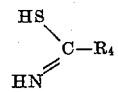

wherein $R_4$ represents an alkyl group, with a carboxylic compound selected from those represented by the following general formula:

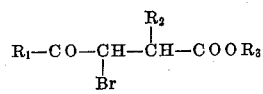

wherein $R_1$ represents a member selected from the group consisting of an aryl group and a 2-thienyl group, and $R_2$ and $R_3$ each represents a member selected from the group consisting of hydrogen, an alkyl group, an aralkyl group and an aryl group.

12. A process for preparing a thiazole compound comprising condensing a compound selected from those represented by the following general formula:

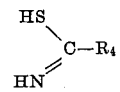

wherein $R_4$ represents an alkylthio group, with a carboxylic compound selected from those represented by the following general formula:

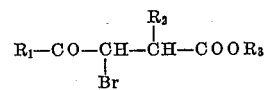

wherein $R_1$ represents a member selected from the group consisting of an aryl group and a 2-thienyl group, and $R_2$ and $R_3$ each represents a member selected from the group consisting of hydrogen, an alkyl group, an aralkyl group and an aryl group.

13. A process for preparing a thiazole compound comprising condensing thiourea with a carboxylic compound selected from those represented by the following general formula:

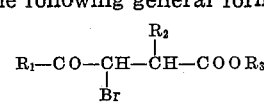

wherein $R_1$ represents a member selected from the group consisting of an aryl group and a 2-thienyl group, and $R_2$ and $R_3$ each represents a member selected from the group consisting of hydrogen, an alkyl group, an aralkyl group and an aryl group.

EDWARD B. KNOTT.

REFERENCES CITED

The following references are of record in the file of this patent:

FOREIGN PATENTS

| Number | Country | Date |
|---|---|---|
| 658,353 | Germany | 1938 |

OTHER REFERENCES

Jr. Amer. Chem. Soc., vol. 56, pp. 970-1 (1934).